United States Patent
Wu et al.

(10) Patent No.: US 11,378,269 B2
(45) Date of Patent: Jul. 5, 2022

(54) PROJECTOR

(71) Applicant: Coretronic Corporation, Hsin-Chu (TW)

(72) Inventors: Pei-Rong Wu, Hsin-Chu (TW); Wen-Yen Chung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 164 days.

(21) Appl. No.: 16/795,573

(22) Filed: Feb. 20, 2020

(65) Prior Publication Data

US 2020/0271307 A1 Aug. 27, 2020

(30) Foreign Application Priority Data

Feb. 27, 2019 (CN) .......................... 201910145036.1

(51) Int. Cl.
| | |
|---|---|
| *F21V 29/76* | (2015.01) |
| *F21V 29/52* | (2015.01) |
| *F21V 29/67* | (2015.01) |
| *G03B 21/14* | (2006.01) |

(52) U.S. Cl.
CPC .............. *F21V 29/76* (2015.01); *F21V 29/52* (2015.01); *F21V 29/673* (2015.01); *G03B 21/145* (2013.01)

(58) Field of Classification Search
CPC ......... H04N 9/3144; H04N 9/31–3197; G03B 21/16; G03B 21/00–64
See application file for complete search history.

(56) References Cited

U.S. PATENT DOCUMENTS

| | | | |
|---|---|---|---|
| 6,398,366 B1 | 6/2002 | Hara et al. | |
| 2006/0176453 A1* | 8/2006 | Miyamoto | G03B 21/16 353/119 |
| 2009/0153805 A1* | 6/2009 | Li | G03B 21/16 353/57 |

FOREIGN PATENT DOCUMENTS

| | | |
|---|---|---|
| CN | 1469169 | 1/2004 |
| CN | 101135836 | 3/2008 |
| CN | 209570789 | 11/2019 |
| TW | 201122709 | 7/2011 |
| WO | 2007029893 | 3/2007 |

OTHER PUBLICATIONS

"Office Action of China Counterpart Application", dated Sep. 27, 2021, p. 1-p. 6.

* cited by examiner

*Primary Examiner* — Christopher A Lamb, II
(74) *Attorney, Agent, or Firm* — JCIPRNET

(57) ABSTRACT

Embodiments of the disclosure provide a projector including a housing, a light source module, a light engine module, a projection lens module, and a thermal module. An airflow is formed in the housing. The thermal module is disposed in the housing and includes a base and a plurality of fins. The housing has a space for accommodating the thermal module, and a dimension of the space is L. An average velocity of the airflow before entering the plurality of fins is V, and a pitch between adjacent fins of the plurality of fins is P, and a reference value Y=[2.9*(V+1)*(P−2.3)/\2+2.4*(V−3.308) /\2+15.82], and when L is greater than or equal to Y, the thermal module is a three-dimensional vapor chamber thermal module or a tower thermal module.

27 Claims, 6 Drawing Sheets

PROJECTOR

CROSS-REFERENCE TO RELATED APPLICATION

This application claims the priority benefit of China application serial no. 201910145036.1, filed on Feb. 27, 2019. The entirety of the above-mentioned patent application is hereby incorporated by reference herein and made a part of this specification.

BACKGROUND

Technical Field

The disclosure relates to a projector, and more particularly to a projector that adopts different types of thermal modules according to the dimension of the space.

Description of Related Art

A projector is a projection device for generating an image, often used for film screenings and conference presentations. Briefly speaking, the imaging principle of the projector is: by a light source module, to generate a light source; by elements such as a filter, a color wheel or a beam splitter, to convert the light into a light including three colors of red, green and blue; by a transmission or reflection ways, to pass the light irradiating on a light valve to a lens; and then by the lens, to project an image on a screen or a wall.

Due to the improvement of performance and the demand for a miniaturized structure, the existing projectors only have a limited heat dissipation space between various elements in the projector, such as the light source module, the light engine module and the projection lens module; therefore, it is necessary to place a suitable thermal module in the limited heat dissipation space to achieve the best heat dissipation effect. Since thermal modules have a wide variety of types and have different heat dissipation efficiency, the conventional test method is to place various thermal modules in the heat dissipation space sequentially and measure the temperature of the projector combined with different types of thermal modules during operation to find out the most suitable thermal module.

However, the above test method lacks appropriate determination criteria, which results in prolonging the required test time and is unfavorable to shortening the manufacturing time of the projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projector in which the type of the thermal module to be adopted depends on the dimension of the space, the airflow state, and/or the parameters of the thermal module, and then a suitable thermal module is adopted to shorten the manufacturing time of the projector.

A projector of an embodiment of the disclosure includes a housing, a light source module, a light engine module, a projection lens module, and a thermal module. An airflow may be formed in the housing. The light source module may be disposed in the housing and configured to provide an illumination beam. The light engine module may be disposed in the housing and configured to convert the illumination beam into an image beam. The projection lens module may be configured to project the image beam to form an image. The thermal module may be disposed in the housing and includes a base and a plurality of fins. The housing has a space for accommodating the thermal module, and a dimension of the space is L, and an average velocity of the airflow before entering the plurality of fins is V, and a pitch between adjacent fins of the plurality of fins is P, and a reference value $Y=[2.9*(V+1)*(P-2.3)^\wedge2+2.4*(V-3.308)^\wedge2+15.82]$, and when L is greater than or equal to Y, the thermal module is a three-dimensional vapor chamber thermal module or a tower thermal module.

A projector of an embodiment of the disclosure includes a housing, a light source module, a light engine module, a projection lens module, and a three-dimensional vapor chamber thermal module. The light source module may be disposed in the housing and may be configured to provide an illumination beam. The light engine module may be disposed in the housing and may be configured to convert the illumination beam into an image beam. The projection lens module may be configured to project the image beam to form an image. The three-dimensional vapor chamber thermal module may be disposed in the housing. The three-dimensional vapor chamber thermal module may include a base having a first internal space, at least one heat pipe having a second internal space, a plurality of fins and a fluid. The first internal space of the base and the second internal space of the at least one heat pipe communicate with each other. The plurality of fins may be disposed on the at least one heat pipe. The fluid flowing in the first internal space and the second internal space.

A projector of an embodiment of the disclosure includes a housing, a light source module, a light engine module, a projection lens module, and a tower thermal module. The light source module may be disposed in the housing and may be configured to provide an illumination beam. The light engine module may be disposed in the housing and may be configured to convert the illumination beam into an image beam. The projection lens module may be configured to project the image beam to form an image. The tower thermal module may be disposed in the housing. The tower thermal module may include a base having at least one groove, at least one heat pipe, and a plurality of fins. The at least one heat pipe may be partially disposed in the at least one groove. The plurality of fins may be disposed on the at least one heat pipe.

Based on the above, in the projector of the disclosure, the type of the thermal module to be used is determined based on the relative magnitude of the reference value and the dimension of the space. The reference value is calculated by considering parameters such as the pitch of the fins of the thermal module and the flow velocity of the airflow. When the dimension L of the space of the projector is greater than or equal to the reference value Y, a three-dimensional vapor chamber thermal module or a tower thermal module may be adopted to achieve better heat dissipation effects; in contrast, when the dimension L of the space of the projector is less than the reference value Y, other types of thermal modules may be adopted. By comparing the reference value with the dimension of the space, it is possible to quickly know which type of thermal module the projector may adopt to achieve a better heat dissipation effect, thereby shortening the manufacturing time of the projector.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

It should be understood that, for clearly showing embodiments of the disclosure, the drawings are not necessarily drawn to scale.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
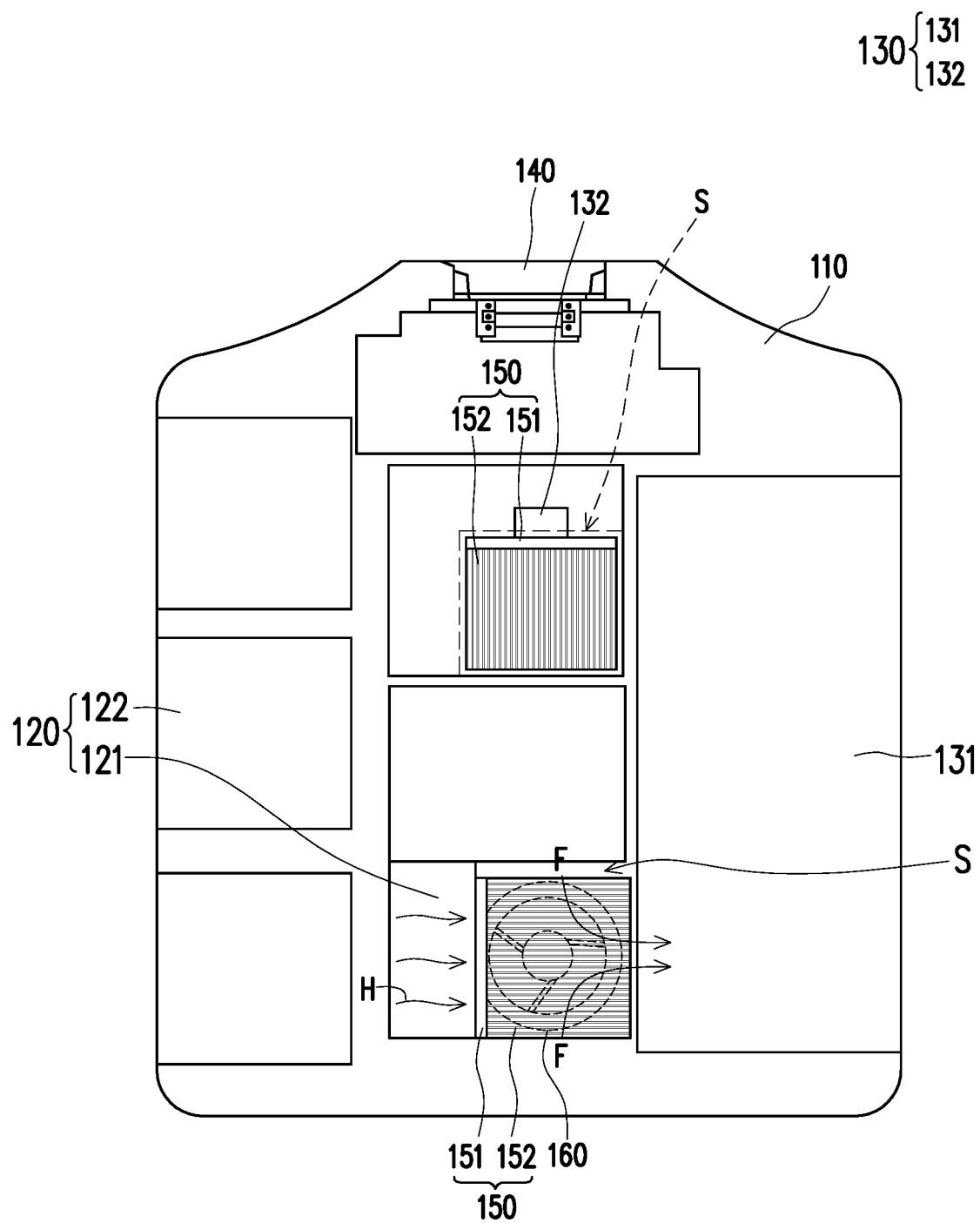
FIG. 1A is a schematic diagram showing a structural configuration of a projector according to an embodiment of the disclosure.
Figure 1B:
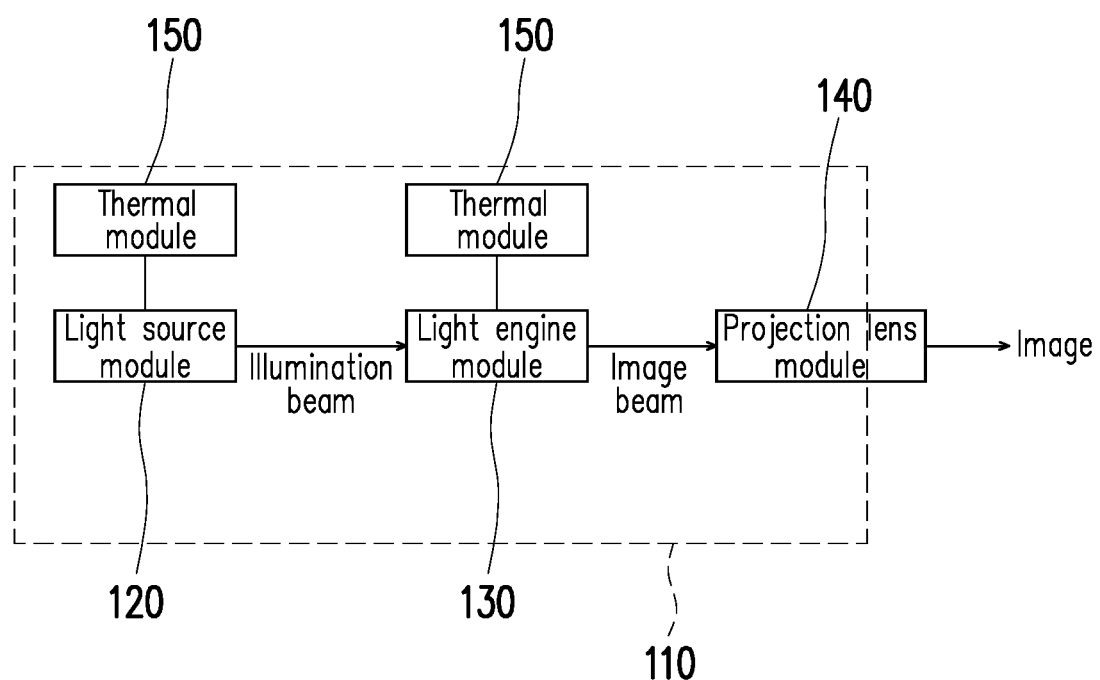
FIG. 1B is a schematic operational block diagram of the projector of FIG. 1A.
Figure 2A:
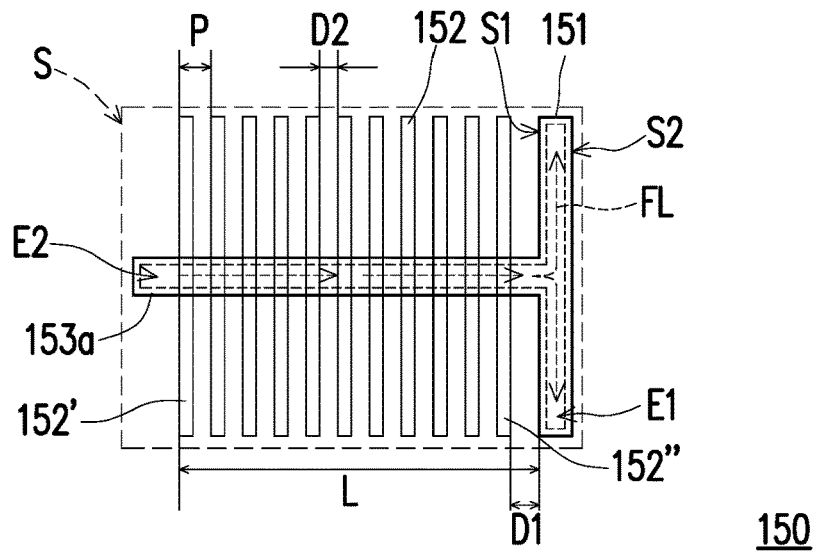
FIG. 2A is a schematic plan view of a three-dimensional vapor chamber thermal module.
Figure 2B:
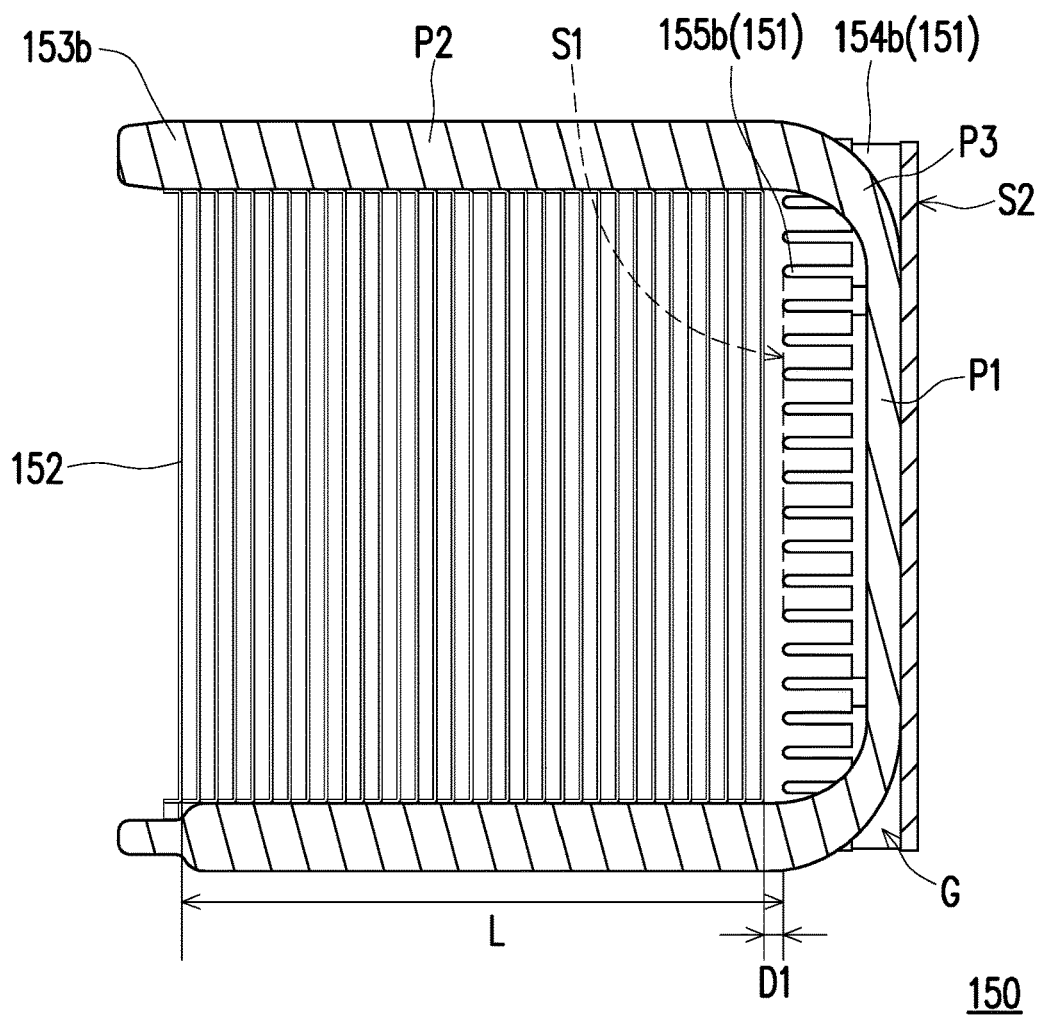
FIG. 2B is a schematic plan view of a tower thermal module.

FIG. 1A is a schematic diagram showing a structural configuration of a projector according to an embodiment of the disclosure. FIG. 1B is a schematic operational block diagram of the projector of FIG. 1A. FIG. 2A is a schematic plan view of a three-dimensional vapor chamber thermal module. FIG. 2B is a schematic plan view of a tower thermal module.

With reference to FIGS. 1A and 1B, among some embodiments, a projector 100 of this embodiment includes a housing 110, a light source module 120, a light engine module 130, a projection lens module 140, and a thermal module 150.

In some embodiments, in the projector 100, an airflow F is formed in the housing 110 for heat dissipation. The housing 110 may be made of a material such as aluminum metal, plastic, or resin (such as white polycarbonate or white silicone). Other elements of the projector 100 may be located at least partially in the housing 110, and the housing 110 is configured to provide support and accommodating space for other elements of the projector 100. In some embodiments, some of the elements of the projector, such as a lens, may extend out of the housing 110. In the housing 110, the flow direction or flow velocity of the airflow F may be varied by elements in the housing 110, such as fans, blowers, or spoiler mechanisms. For example, an airflow may also be formed outside the housing 110, and this airflow is circulated in communication with the airflow inside the housing 110 to facilitate heat dissipation. The flow direction of the airflow F marked in FIG. 1A of the disclosure is for illustrative purposes only and is not intended to limit the disclosure.

In some embodiments, the light source module 120 may be disposed in the housing 110. The light source module 120 may include at least one light emitting element (not shown) and may be configured to provide an illumination beam. For example, the light source module 120 may include a plurality of laser diodes, light emitting diodes, or other solid-state illumination sources arranged in an array. In a further embodiment, the light emitting elements may include a red light emitting unit 121 and/or a blue light emitting unit 122 that can respectively emit red and blue light to form an illumination beam.

In some embodiments, the light engine module 130 may be disposed in the housing 110. The light engine module 130 may be located on the transmission path of the illumination beam and may be configured to convert the illumination beam into an image beam. For example, the light engine module 130 may include a light valve 132, a wavelength conversion device (not shown) and a combination of a plurality of lenses (not shown), wherein the light valve 132 adopts a reflective light modulator such as a digital micromirror device (DMD). The digital micro-mirror device may be composed a plurality of, for example a of tens of thousands of, micro-mirrors. When a video signal is transmitted to the light engine module 130, the digital micro-mirror device (DMD) is automatically flipped and adjusted to a corresponding reflection angle, thereby reflecting the image beam to the projection lens module 140. In other embodiments, the light valve 132 may be a transmissive spatial light modulator, such as a transparent liquid crystal panel. The disclosure does not limit the mode and type of the light valve 132.

In some embodiments, the wavelength conversion device may be disposed between the light emitting elements of the light source module 120 and the light valve 132 of the light engine module 130. The wavelength conversion device may be a phosphor wheel or a fluorescence wheel which can convert an excitation beam with a first wavelength into a converted beam with a second wavelength. However, the disclosure is not limited to the above.

In some embodiments, a plurality of lenses may be disposed on the transmission path of the beam to reflect, refract or converge the beam. For example, the lens may be lenses having surfaces with different diopters, such as a convex lens, a concave lens, or a meniscus lens, or may be a combination of the above lenses. However, the disclosure is not limited to the above.

In some embodiments, the light engine module 130 may further include a power supply 131 (LPVS). The power supply 131 may be configured to couple to and convert an external power source to assist in powering elements such as the light valve 132 and a wavelength conversion device driver.

In some embodiments, the projection lens module 140 may be configured to project the image beam to form an image. The projection lens module 140 may include a plurality of lenses which can enlarge the image to project it on a screen or a wall.

In the embodiment shown in FIGS. 1A and 1B, the light source module 120, the light engine module 130, and the projection lens module 140 of the projector 100 may be at least partially disposed in the housing 110. In some embodiments, some elements of the projector 100 may generate heat during operation, such as the number of the light emitting elements of the light source module 120. In addition, some elements of the projector 100 may be susceptible to high temperatures during operation, which causes their efficiency to be decreased, such as the digital micro-mirror device (DMD) of the light engine module 130. In the embodiment, the projector 100 may include a thermal module 150. The thermal module 150 may be disposed in the housing 110 and may include a base 151 and a plurality of fins 152.

In detail, the housing 110 of the projector 100 has a space for accommodating the thermal module 150. For example, there is at least one space S between the light source module 120 and the light engine module 130, and the thermal module 150 is located in the space S. The thermal module 150 disposed in the space S may dissipate heat for one or more heat sources of the projector 100. For example, the base 151 of the thermal module 150 may contact the red light emitting unit 121 of the light source module 120 to assist in the dissipation of heat H. The heat H transferred to the base 151 is further transferred to the plurality of fins 152 so that the heat is transferred to other locations of the housing 110 or to the outside of the housing 110 for rapid heat dissipation. In some embodiments, as shown in FIG. 1A, the thermal module 150 may be disposed between the light source module 120 and the light engine module 130. For example, the thermal module 150 may be disposed in the space S between the red light emitting unit 121 and the power supply 131. In some embodiments, the space S in the housing 110 for accommodating the thermal module 150 may have a cross section in a square or rectangular shape; however, the disclosure is limited thereto. In other embodiments, the space S may have a cross section in a trapezoidal or other irregular shapes. In still other embodiments, the space S may be a combination of a plurality of sub-spaces, and the plurality of sub-spaces may have cross sections in a square, rectangular or trapezoidal shape or other regular or irregular shapes.

In another embodiment, as shown in FIG. 1A, the base 151 of the thermal module 150 may be disposed to contact the light valve 132 of the light engine module 130 to dissipate heat for the light valve 132. Further, the projector 100 may further include a fan 160 disposed in the housing 110. The fan 160 may be configured to direct the airflow F into the thermal module 150.

FIG. 2A is a schematic plan view of a three-dimensional vapor chamber thermal module. FIG. 2B is a schematic plan view of a tower thermal module.

In some embodiments, the space S in the housing 110 for accommodating the thermal module 150 has a dimension L which is the dimension of the fins of the thermal module 150; that is, the dimension L is the dimension in the space S for accommodating the fins of the thermal module 150. The average velocity of the airflow F before entering the plurality of fins is V, and the pitch between adjacent fins of the plurality of fins 152 is P. A reference value Y=[2.9*(V+1)*(P−2.3)^2+2.4*(V−3.308)^2+15.82], where the symbol "^" represents the power; for example, "^2" represents the square, or the power of two, and "^4" represents the power of four. When the dimension L is greater than or equal to the reference value Y, a three-dimensional vapor chamber thermal module or a tower thermal module may be selected as the thermal module 150. In addition, the units of the parameters of L, Y, V, and P are millimeters (mm), millimeters (mm), meters per second (m/s), and millimeters (mm), respectively.

With reference to FIGS. 2A and 2B, in some embodiments, the base 151 of the thermal module 150 includes a first surface S1 and a second surface S2 which are opposite and parallel to each other. The plurality of fins 152 are disposed parallel to the first surface S1 or the second surface S2, and the first surface S1 is interposed between the plurality of fins 152 and the second surface S2, wherein the second surface S2 is configured to contact a heat source, such as the red light emitting unit 121 or the light valve 132. In some embodiments, the second surface S2 may be a flat surface, or the second surface S2 may include a boss. However, the disclosure is not limited to the above. In the embodiment, the dimension L of the space S is equal to a distance from the first surface S1 to a fin 152' that is furthest from the first surface S1.

In some embodiments, a distance D1 from the first surface S1 to a fin 152" that is closest to the first surface S1 is less than about 10 mm. Moreover, in some embodiments, each fin 152 has a thickness in the range of from about 0.2 mm to about 0.3 mm. In some embodiments, a distance D2 between adjacent fins of the plurality of fins 152 is less than about 5 mm. It should be understood that various numerical values or ranges of numerical values are merely illustrative of each embodiment and are not intended to limit the disclosure.

With reference to FIGS. 1A and 2A, among some embodiments, the thermal module 150 of this embodiment is a three-dimensional vapor chamber thermal module (3DVC). The three-dimensional vapor chamber thermal module (3DVC) may include at least one heat pipe 153a. The plurality of fins 152 are disposed on the at least one heat pipe 153a and may be disposed in parallel with each other. The base 151 may have a first internal space E1, and the at least one heat pipe 153a may have a second internal space E2, and the first internal space E1 and the second internal space E2 communicate with each other. In some embodiments, the three-dimensional vapor chamber thermal module (3DVC) may further include a fluid FL flowing in the first internal space E1 and the second internal space E2. In some embodiments, the action of the fluid FL is briefly described as follows. The fluid FL absorbs the heat H on the base 151 through heat transfer and is vaporized by heat, and the vaporized fluid FL flows into the at least one heat pipe 153a and transfers the heat H to the plurality of fins 152 and is condensed into a liquid, and the condensed fluid FL flows back to the first internal space E1 to complete the heat dissipation loop. For example, the fluid FL may be a working fluid such as water or alcohol that evaporates and condenses in a target temperature range and may be enclosed in a tube body that has degassed a non-condensable gas such as air. In some embodiments, a capillary structure may be disposed inside the tube body, which can provide a higher capillary force of the working fluid to improve the heat transfer capability, thereby achieving rapid heat dissipation by utilizing the latent heat and/or capillary force of the working fluid.

Further, in some embodiments, the base 151 may be in a flat plate shape, and the at least one heat pipe 153a is perpendicularly connected to the first surface S1 of the base 151, and the plurality of fins 152 are parallel to the base 151. The distance D1 from the first surface S1 to the fin 152" closest to the first surface S1 is in the range of 2 to 5 mm. In the embodiment, a boss may be extended from the second surface S2 of the base 151 for contacting a heat source of a digital micro-mirror device (DMD), for example. In the embodiment, the boss may have a boss top surface parallel to the second surface S2, and the boss top surface may be a flat surface for contacting the heat source. However, the disclosure is not limited to the above. In such a configuration, the shape of the boss and its position on the second surface S2 of the base 151 may be set according to the space in which the DMD is located within the projector. For example, the second surface S2 of the base 151 may not be in full contact with the DMD due to the position of the DMD and the limitation of the space. With the boss on the second surface S2, the heat generated by the DMD may be effectively transferred to the base 151 through the boss for further heat dissipation. In some embodiments, the boss may be a square boss, but the disclosure is not limited thereto.

For example, in the embodiment adopting the three-dimensional vapor chamber thermal module, the three-dimensional vapor chamber thermal module can avoid or reduce bending and flattening parts of the heat pipe (the bending and flattening parts of the heat pipe need additional accommodation space) and thus can achieve better heat dissipation efficiency in a limited space. However, the disclosure is not limited to the above. In some embodiments, in view of the shape of the space in the housing 110 for accommodating the three-dimensional vapor chamber thermal module, the invalid end of the heat pipe of the thermal module may be placed in scattering regions (such as leftover regions) among other elements to effectively use the space and to achieve better heat dissipation efficiency. However, the disclosure is not limited to the above.

With reference to FIGS. 1A and 2B, in some embodiments of the disclosure, the thermal module 150 is a tower thermal module. The tower thermal module may include at least one heat pipe 153b, and the plurality of fins 152 may be disposed on the at least one heat pipe 153b and may be disposed in parallel with each other. The base 151 has at least one groove G, and the at least one heat pipe 153b is partially disposed in the at least one groove G. Further, the at least one heat pipe 153b is a U-shaped heat pipe and includes a first part P1 located in the at least one groove G of the base 151, a second part P2 located outside the base 151 and being perpendicular to the base 151, and a third part P3 interposed between the first part P1 and the second part P2 and presented in a curved state.

In the embodiment, the base 151 may include a metal substrate 154b and a plurality of sub-fins 155b. The plurality of sub-fins 155b is perpendicular to the metal substrate 154b. In the embodiment, the base 151 may include the first surface S1 and the second surface S2 which are opposite and parallel to each other, wherein the first surface S1 is a discontinuous surface formed by the ends of the plurality of sub-fins 155b. In the embodiment, the plurality of fins 152 may be disposed in parallel to the metal substrate 154b. In detail, the first part P1 is the bottom of the U-shaped heat pipe and is embedded in the at least one groove G. The second part P2 is two vertical parts of the U-shaped heat pipe and the plurality of fins 152 are disposed on the second part P2. The third part P3 is turning parts of the U-shaped heat pipe. In some embodiments, the metal substrate 154b and the plurality of sub-fins 155b are integrally formed by machining, and the material thereof may be a metal material having a heat transfer coefficient greater than 90 W/(m·K), such as aluminum, copper or stainless steel. For example, in some embodiments, the base 151 including the metal substrate 154b and the plurality of sub-fins 155b may be implemented as an aluminum extrusion thermal module.

For example, in the embodiment adopting the tower thermal module, since the bending part of the heat pipe is embedded in the base and at the bending part of the heat pipe, the plurality of sub-fins 155b are disposed on a metal substrate 154b (that is, the plurality of sub-fins 155b are distributed around the bending part of the heat pipe), and this avoids or reduces the space waste caused by the bending part of the heat pipe, thereby achieving better heat dissipation efficiency in a limited space. However, the disclosure is not limited to the above.

Further, the dimension L of the distance from the first surface S1 of the base 151 to the fin 152 furthest from the first surface S1 is in the range of 8 to 24 mm. The distance D1 from the first surface S1 to the fin 152 closest to the first surface S1 is less than 5 mm. It should be understood that various numerical values or ranges of numerical values are merely illustrative of each embodiment and are not intended to limit the disclosure.

In the projector 100 of the disclosure, when L is less than the reference value Y, the thermal module may be implemented as a stacked fin thermal module, an extrusion thermal module (such as an aluminum extrusion thermal module), or a normal thermal module.

Figure 2C:
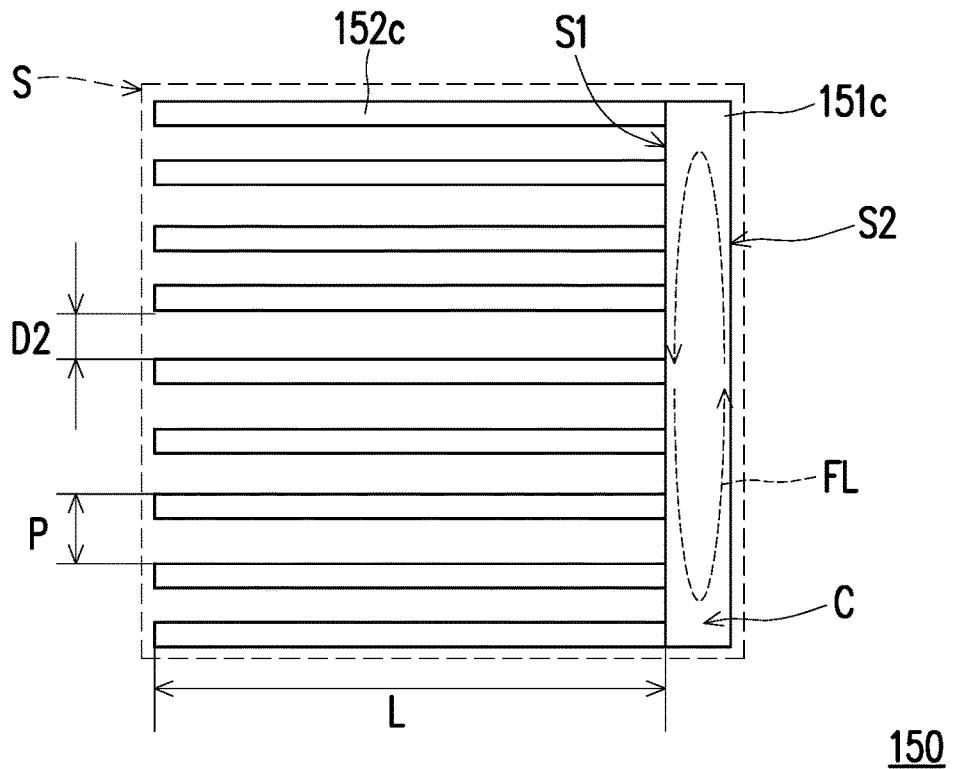
FIG. 2C is a schematic plan view of a stacked fin thermal module.
Figure 2D:
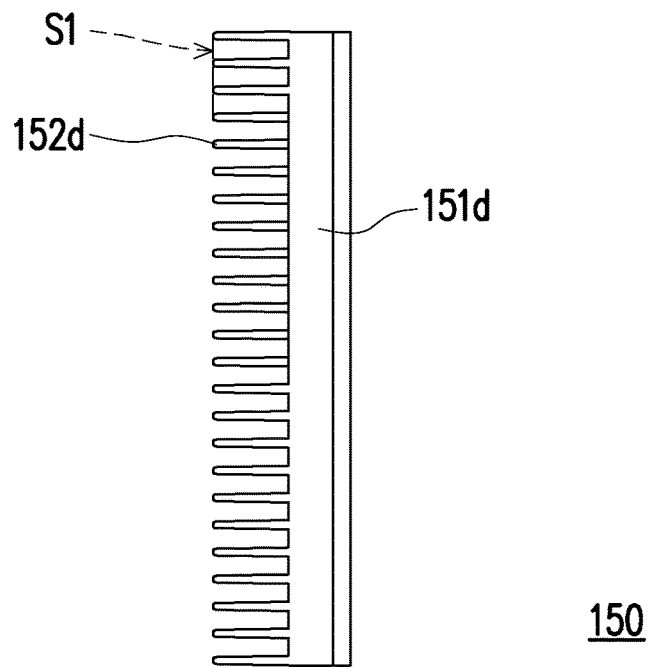
FIG. 2D is a schematic plan view of an extrusion thermal module.
Figure 2E:
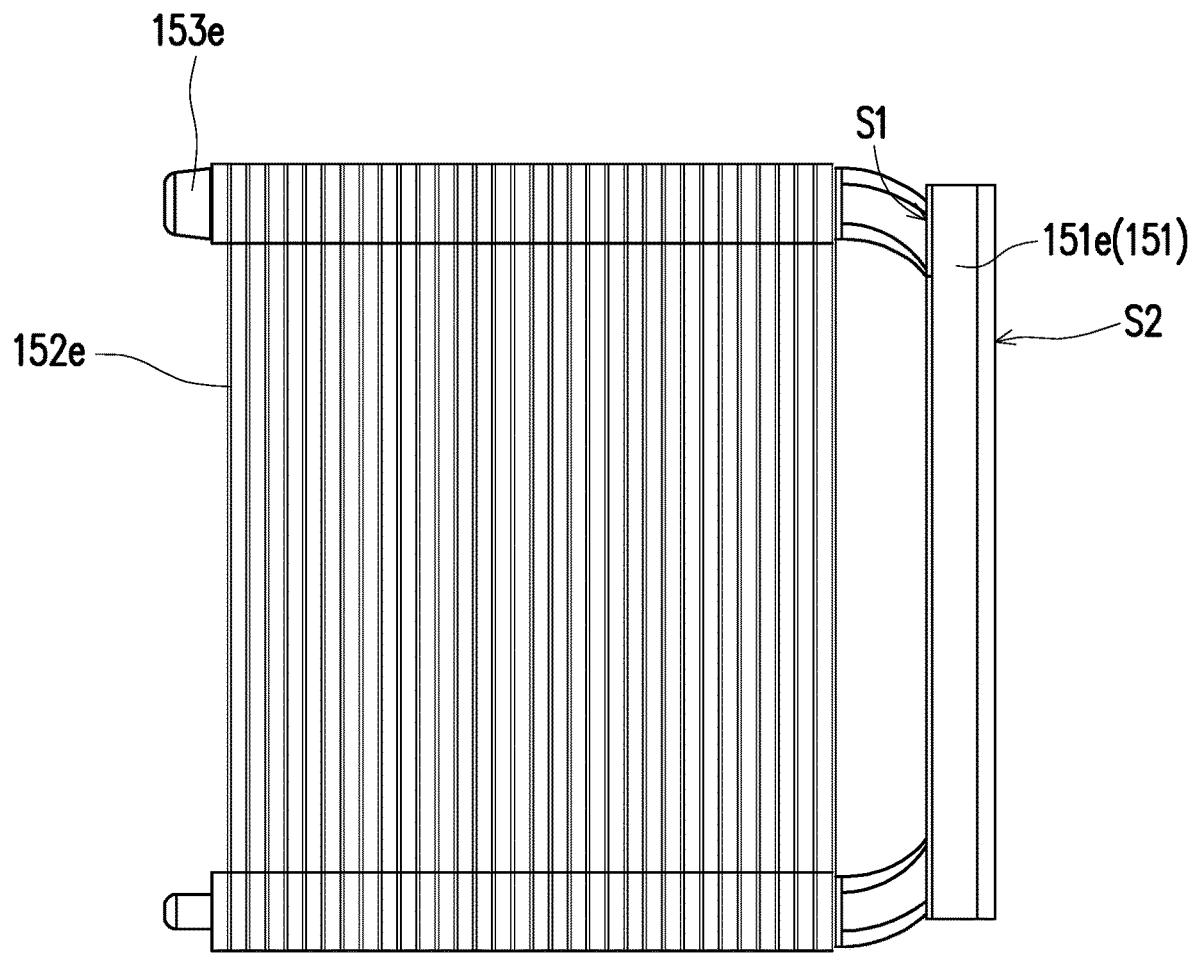
FIG. 2E is a schematic plan view of a normal thermal module.

Some embodiments as shown in FIGS. 2C, 2D, and 2E are described below. FIG. 2C is a schematic plan view of a stacked fin thermal module. FIG. 2D is a schematic plan view of an extrusion thermal module. FIG. 2E is a schematic plan view of a normal thermal module.

With reference to FIG. 2C, in some embodiments, the stacked fin thermal module includes a base 151c, a plurality of fins 152c, and the fluid FL, wherein the base 151c includes a two-dimensional vapor chamber C. The plurality of fins 152c are disposed on the first surface S1 of the base 151c and are perpendicular to the base 151c, wherein the plurality of fins 152c are arranged in parallel with each other and are integrally connected to the base 151c by soldering. The fluid FL is fluidly disposed in the two-dimensional vapor chamber C and can improve the heat dissipation effect of the base 151c.

With reference to FIG. 2D, in some embodiments, a plurality of fins 152d of the extrusion thermal module are perpendicular to a base 151d. In this embodiment, the first surface S1 is a discontinuous surface formed by the ends of the plurality of fins 152d. The base 151d and the plurality of fins 152d are integrally formed by machining, and the material thereof may be a metal material having a heat transfer coefficient greater than 90 W/(m·K), such as aluminum, copper or stainless steel. For example, in some embodiments, the plurality of fins 152d and the base 151d may be implemented as an aluminum extrusion thermal module.

With reference to FIG. 2E, in some embodiments, the normal thermal module is similar to the tower thermal module shown in FIG. 2B. The difference is that a base 151e does not include a plurality of sub-fins; therefore, the first surface S1 of the base 151e forms a continuous surface. Further, a plurality of fins 152e of the normal thermal module may be disposed in parallel to the base 151e or the base 151. The normal thermal module includes at least one heat pipe 153e, and the plurality of fins 152e are disposed on the at least one heat pipe 153e and are disposed in parallel with each other. The at least one heat pipe 153e is partially disposed in the base 151e. In some embodiments, in a projector adopting at least one thermal module, a cooling element such as a thermoelectric cooler (TEC) may be disposed between the thermal module and the heat source. For example, the cooling element may be a Peltier effect-based heat dissipation element to achieve better heat dissipation efficiency. However, the disclosure is not limited to the above.

Figure 3:
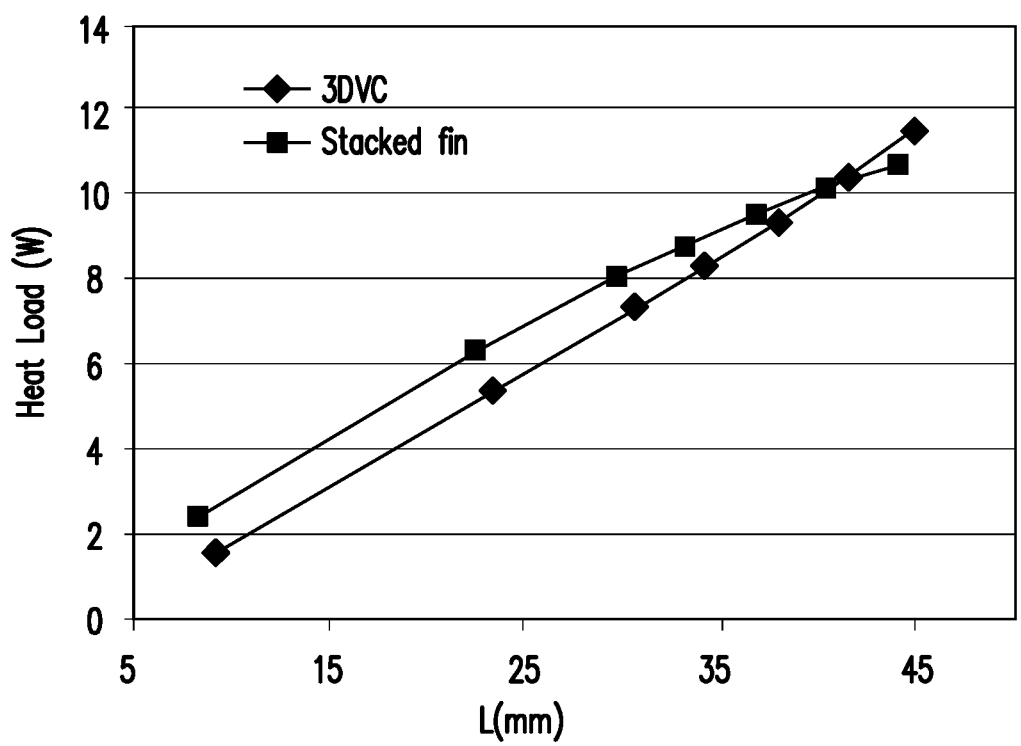
FIG. 3 is a comparison diagram of heat dissipation efficiency of the three-dimensional vapor chamber thermal module and the stacked fin thermal module.

FIG. 3 is a comparison diagram of heat dissipation efficiency of the three-dimensional vapor chamber thermal module and the stacked fin thermal module.

With reference to FIGS. 1A, 2A, 2C and 3, in some embodiments, for example, in the projector 100, the average velocity V of the airflow F before entering the plurality of fins is 0.5 m/s, and the pitch P between adjacent fins of the plurality of fins 152 is 1.2 mm, and the reference value Y is calculated according to the equation $[2.9*(V+1)*(P-2.3)\wedge 2+2.4*(V-3.308)\wedge 2+15.82]$ to be 40 mm. In this embodiment, when the dimension L of the space in the housing 110 for accommodating the thermal module is greater than or equal to 40 mm, disposing the three-dimensional vapor chamber thermal module or the tower thermal module may achieve a better heat dissipation effect. As shown in FIG. 3, when the dimension L of the space for accommodating the thermal module is greater than or equal to 40 mm, such as 40 mm or 45 mm, the heat dissipation efficiency of the three-dimensional vapor chamber thermal module (3DVC) is better than that of the stacked fin thermal module. When the dimension L of the space for accommodating the thermal module is less than 40 mm, the heat dissipation efficiency of the stacked fin thermal module is better than that of the three-dimensional vapor chamber thermal module. The units of the parameters of L, Y, V, and P are millimeters (mm), millimeters (mm), meters per second (m/s), and millimeters (mm), respectively.

Based on the above, in the projector of the disclosure, the type of the thermal module to be used is determined based on the relative magnitude of the reference value and the dimension of the space. The reference value is calculated by considering parameters such as the pitch of the fins of the thermal module and the flow velocity of the airflow. When the dimension L of the space of the projector is greater than or equal to the reference value Y, a three-dimensional vapor chamber thermal module or a tower thermal module may be adopted to achieve better heat dissipation effects; in contrast, when the dimension L of the space of the projector is less than the reference value Y, other types of thermal modules may be adopted. By comparing the reference value with the dimension of the space, it is possible to quickly know which type of thermal module the projector may adopt to achieve a better heat dissipation effect, thereby shortening the manufacturing time of the projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
   a housing, in which an airflow is formed;
   a light source module, disposed in the housing and configured to provide an illumination beam;
   a light engine module, disposed in the housing and configured to convert the illumination beam into an image beam;
   a projection lens module, configured to project the image beam to form an image; and
   a thermal module, disposed in the housing and comprising a base and a plurality of fins,
   wherein the housing has a space for accommodating the thermal module, a dimension of the space is L, an average velocity of the airflow before entering the plurality of fins is V, and a pitch between adjacent fins of the plurality of fins is P, wherein a reference value $Y=[2.9*(V+1)*(P-2.3)\wedge 2+2.4*(V-3.308)\wedge 2+15.82]$, and when L is greater than or equal to Y, the thermal module is a three-dimensional vapor chamber thermal module or a tower thermal module.

2. The projector according to claim 1, wherein the three-dimensional vapor chamber thermal module further comprises:
at least one heat pipe, on which the plurality of fins are disposed; and
a fluid,
wherein the base has a first internal space, the at least one heat pipe has a second each other, and the fluid flows in the first internal space and the second internal space.

3. The projector according to claim 2, wherein the base is in a flat plate shape, the at least one heat pipe is perpendicular to the base, and the plurality of fins are parallel to the base.

4. The projector according to claim 2, wherein the base of the thermal module comprises a first surface and a second surface which are opposite and parallel to each other, the plurality of fins are disposed parallel to the first surface or the second surface, and the first surface is interposed between the plurality of fins and the second surface, wherein a distance from the first surface to a fin closest to the first surface is in the range of 2 to 5 mm.

5. The projector according to claim 1, wherein the tower thermal module further comprises:
at least one heat pipe, on which the plurality of fins are disposed,
wherein the base has at least one groove, and the at least one heat pipe is partially disposed in the at least one groove.

6. The projector according to claim 5, wherein the base comprises a metal substrate and a plurality of sub-fins, the plurality of sub-fins are perpendicular to the metal substrate, and the plurality of fins are parallel to the metal substrate.

7. The projector according to claim 5, wherein the at least one heat pipe is a U-shaped heat pipe and comprises a first part located in the base, a second part located outside the base and being perpendicular to the base, and a third part interposed between the first part and the second part.

8. The projector according to claim 5, wherein the base of the thermal module comprises a first surface and a second surface which are opposite and parallel to each other, the plurality of fins are disposed parallel to the first surface or the second surface, and the first surface is interposed between the plurality of fins and the second surface, wherein a distance from the first surface to a fin furthest from the first surface is in the range of 8 to 24 mm, and a distance from the first surface to a fin closest to the first surface is less than 5 mm.

9. The projector according to claim 5, wherein the metal substrate and the plurality of sub-fins are integrally formed, and a material of the metal substrate and the plurality of sub-fins is a metal material having a heat transfer coefficient greater than 90 W/(m.K).

10. The projector according to claim 9, wherein the material of the metal substrate and the plurality of sub-fins is aluminum, copper or stainless steel.

11. The projector according to claim 1, wherein the light source module comprises a red light emitting unit, and the thermal module contacts the red light emitting unit.

12. The projector according to claim 1, wherein the base comprises a first surface and a second surface which are opposite and parallel to each other, wherein the first surface is interposed between the plurality of fins and the second surface, and the thermal module further comprises a boss extending from the second surface of the base.

13. The projector according to claim 12, wherein the light engine module comprises a light valve, and the boss contacts the light valve.

14. The projector according to claim 1, wherein the base of the thermal module comprises a first surface and a second surface which are opposite and parallel to each other, the plurality of fins are disposed parallel to the first surface or the second surface, the first surface is interposed between the plurality of fins and the second surface, and the dimension L of the space is equal to a distance from the first surface to a fin that is furthest from the first surface.

15. The projector according to claim 14, wherein a distance from the first surface to a fin that is closest to the first surface is less than 10 mm.

16. The projector according to claim 1, wherein the plurality of fins have a thickness in the range of 0.2 mm to 0.3 mm.

17. The projector according to claim 1, wherein a distance between the adjacent fins of the plurality of fins is less than 5 mm.

18. The projector according to claim 1, wherein the space of the housing has a cross section in a square, rectangular or trapezoidal shape.

19. The projector according to claim 18, wherein the space of the housing is a combination of a plurality of sub-spaces, and the plurality of sub-spaces have cross sections in a square, rectangular or trapezoidal shape.

20. The projector according to claim 1, wherein the light engine module further comprises a power supply, and the light source module comprises a red light emitting unit, wherein the power supply is disposed in the housing, and the space is located between the red light emitting unit and the power supply.

21. The projector according to claim 1, wherein the projector further comprises a fan disposed in the housing and configured to direct the airflow into the thermal module.

22. A projector, characterized in comprising:
a housing;
a light source module, disposed in the housing and configured to provide an illumination beam;
a light engine module, disposed in the housing and configured to convert the illumination beam into an image beam;
a projection lens module, configured to project the image beam to form an image; and
a three-dimensional vapor chamber thermal module, disposed in the housing and contacting the light source module or the light engine module, wherein the three-dimensional vapor chamber thermal module comprises:
a base, having a first internal space;
at least one heat pipe, having a second internal space, wherein the first internal space of the base and the second internal space of the at least one heat pipe communicate with each other;
a plurality of fins, disposed on the at least one heat pipe; and
a fluid, contained inside and within the first internal space and the second internal space.

23. The projector according to claim 22, wherein the base is in a flat plate shape, the at least one heat pipe is perpendicular to the base, and the plurality of fins are parallel to the base.

24. The projector according to claim 23, wherein the base comprises a first surface and a second surface which are opposite and parallel to each other, and the first surface is interposed between the plurality of fins and the second surface, and wherein the three-dimensional vapor chamber thermal module further comprises a boss extending from the second surface.

25. A projector, characterized in comprising:
   a housing;
   a light source module, disposed in the housing and configured to provide an illumination beam;
   a light engine module, disposed in the housing and configured to convert the illumination beam into an image beam;
   a projection lens module, configured to project the image beam to form an image; and
   a tower thermal module, disposed in the housing and contacting the light source module or the light engine module, wherein the tower thermal module comprises:
      a base, comprising a metal substrate and a plurality of sub-fins, and the metal substrate having at least one groove;
      at least one heat pipe, partially disposed in the at least one groove; and
      a plurality of fins, disposed on the at least one heat pipe and directly contacted to the at least one heat pipe,
      wherein an extending direction of the plurality of fins and an extending direction of the plurality of sub-fins are perpendicular to each other.

26. The projector according to claim 25, wherein the plurality of sub-fins are perpendicular to the metal substrate, and the plurality of fins are parallel to the metal substrate.

27. The projector according to claim 26, wherein the base comprises a first surface and a second surface which are opposite and parallel to each other, wherein the first surface is interposed between the plurality of fins and the second surface, and wherein the tower thermal module further comprises a boss extending from the second surface.

* * * * *